United States Patent
Kasugai

(10) Patent No.: US 10,261,398 B2
(45) Date of Patent: Apr. 16, 2019

(54) ELECTRONIC DEVICE THAT ACCEPTS A REMOVABLE, EXTERNALLY-CONNECTED DEVICE

(71) Applicant: Panasonic Intellectual Property Management Co., Ltd., Osaka (JP)

(72) Inventor: Hiroki Kasugai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 124 days.

(21) Appl. No.: 15/493,209

(22) Filed: Apr. 21, 2017

(65) Prior Publication Data

US 2018/0019552 A1    Jan. 18, 2018

(30) Foreign Application Priority Data

Jul. 13, 2016 (JP) ................................. 2016-138504
Mar. 8, 2017 (JP) ................................. 2017-043898

(51) Int. Cl.
| | | |
|---|---|---|
| G03B 17/00 | (2006.01) | |
| G03B 17/56 | (2006.01) | |
| G03B 15/05 | (2006.01) | |
| H01R 13/703 | (2006.01) | |

(52) U.S. Cl.
CPC .......... G03B 17/566 (2013.01); G03B 15/05 (2013.01); H01R 13/7038 (2013.01)

(58) Field of Classification Search
CPC ... G03B 17/566; G03B 15/05; H01R 13/7038
See application file for complete search history.

(56) References Cited

U.S. PATENT DOCUMENTS

| | | | | |
|---|---|---|---|---|
| 5,625,237 A | * | 4/1997 | Saeki | H02J 7/027 307/48 |
| 2002/0116482 A1 | * | 8/2002 | Maeda | G06F 9/4411 709/223 |
| 2003/0086388 A1 | * | 5/2003 | Peters | G06F 13/387 370/328 |
| 2008/0307144 A1 | * | 12/2008 | Minoo | G06F 1/1632 710/304 |
| 2009/0244351 A1 | * | 10/2009 | Takamatsu | H04N 5/23212 348/333.01 |

FOREIGN PATENT DOCUMENTS

JP           1-135271        5/1989

* cited by examiner

Primary Examiner — Jeff W Natalini
(74) Attorney, Agent, or Firm — Renner Otto Boisselle & Sklar, LLP

(57) ABSTRACT

The electronic device of the present disclosure has a mounting section, a voltage determiner, and an attach-detach detector. The mounting section accepts a removable, externally-connected device and connects to a data line into which a unit signal having a data period for transmitting a data signal and a detection period for transmitting a detection signal is fed from the externally-connected device. The voltage determiner determines an electric potential of the data line so as to have a first logical value when the externally-connected device is detached from the mounting section. The attach-detach detector detects whether the externally-connected device is mounted on, or detached from the mounting section by detecting the detection signal of the first logical value determined by the voltage determiner or a second logical value.

5 Claims, 6 Drawing Sheets

ELECTRONIC DEVICE THAT ACCEPTS A REMOVABLE, EXTERNALLY-CONNECTED DEVICE

BACKGROUND

1. Technical Field

The present disclosure relates to an electronic device having a hot shoe.

2. Description of the Related Art

Patent Literature 1 discloses an imaging device having an accessory shoe. The accessory shoe of the imaging device described in Patent Literature 1 has an electric contact for connecting a strobe and an electric contact for connecting an external recording microphone.

CITATION LIST

Patent Literature

PTL 1: Japanese Unexamined Patent Application Publication No. H01-135271

SUMMARY

The present disclosure provides an electronic device capable of detecting, with no use of a dedicated detection line, the presence or absence of an externally-connected device.

The electronic device of the present disclosure has a mounting section, a voltage determiner, and an attach-detach detector. The mounting section accepts a removable, externally-connected device and connects to a data line into which a unit signal having a data period for transmitting a data signal and a detection period for transmitting a detection signal is fed from the externally-connected device. The voltage determiner determines an electric potential of the data line so as to have a first logical value when the externally-connected device is detached from the mounting section. The attach-detach detector detects whether the externally-connected device is mounted on, or detached from the mounting section by detecting the detection signal of the first logical value determined by the voltage determiner or a second logical value.

The electronic device of the present disclosure detects the absence or presence of an externally-connected device by using an existing data line, with no use of a dedicated detection line.

DETAILED DESCRIPTION

Hereinafter, an exemplary embodiment will be described in detail, with reference to the accompanying drawings. However, details beyond necessity—for example, descriptions on well-known matters or on substantially identical structures—may be omitted to eliminate redundancy from the description below for easy understanding of those skilled in the art.

It is to be understood that the accompanying drawings and the description below are provided by the applicant for purposes of full understanding of those skilled in the art and are not to be construed as limitation on the scope of the claimed disclosure.

First Exemplary Embodiment

Hereinafter, the structure of the first exemplary embodiment will be described with reference to FIG. 1 through FIG. 6. In the embodiment, imaging device 100 is described as an example of the electronic device and audio input device 200 is described as an example of the externally-connected device. As an externally-connected device, a flashing device can be connected to imaging device 100.

[1-1. Structure]

Figure 1:
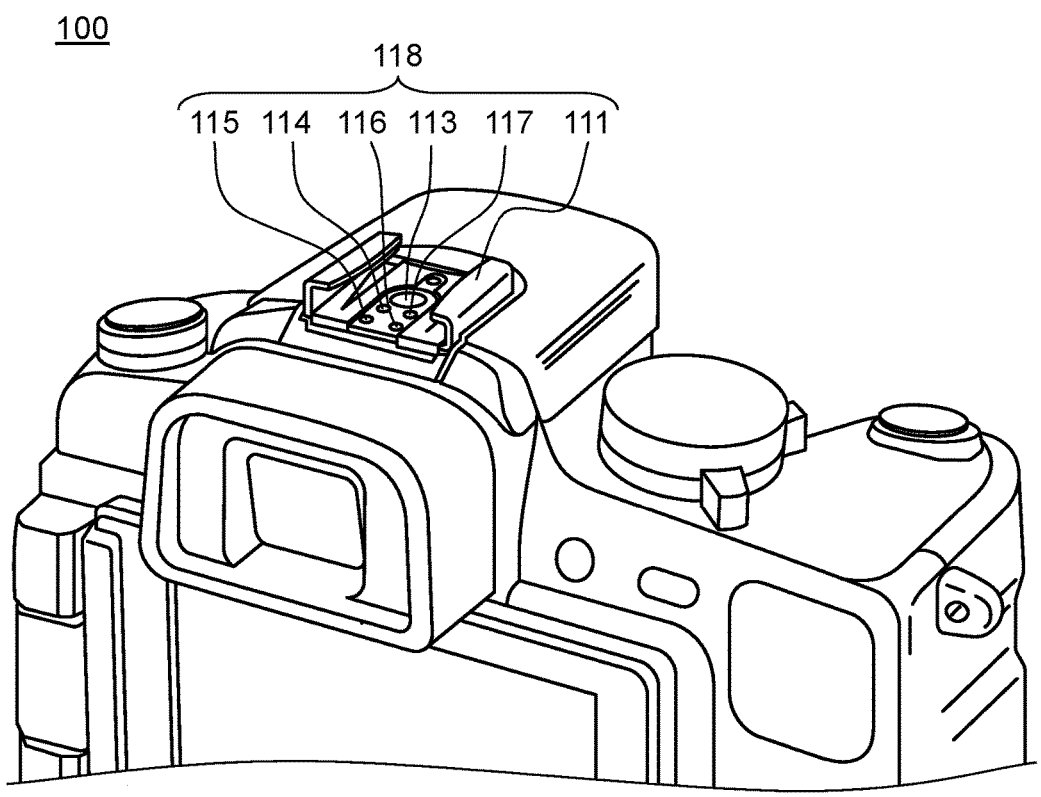
FIG. 1 is a perspective view of the imaging device seen from above in accordance with an exemplary embodiment.

FIG. 1 is a perspective view of imaging device 100 seen from above of the embodiment. As shown in FIG. 1, imaging device 100 has shoe rail 111 and hot shoe 118 having shoe terminals 113 through 117.

Figure 2:
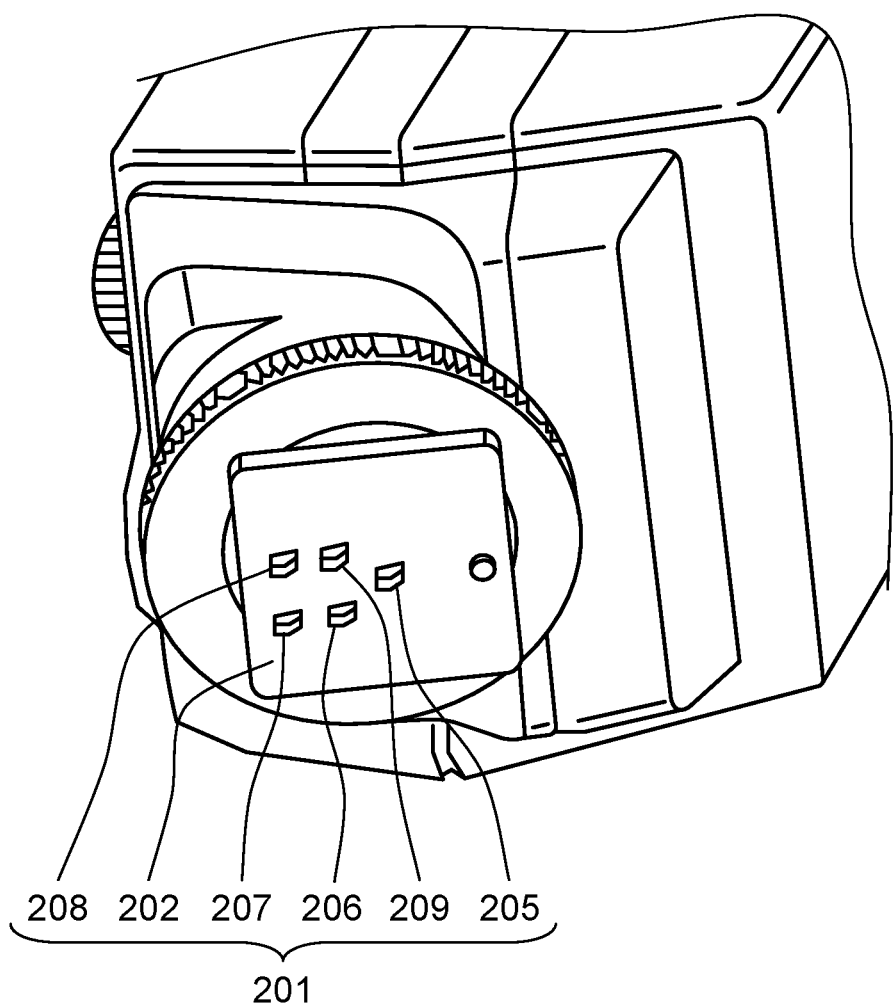
FIG. 2 is a perspective view of a audio input device seen from below in accordance with the exemplary embodiment.

FIG. 2 is a perspective view of audio input device 200 seen from below of the first exemplary embodiment. As shown in FIG. 2, audio input device 200 has fixed plate 202 and connecting section 201 formed of shoe connecting terminals 205 through 209 protruded from fixed plate 202. Audio input device 200 is fixed onto imaging device 100 in a manner that fixed plate 202 is inserted into shoe rail 111 of imaging device 100. When audio input device 200 is fixed to imaging device 100, shoe terminals 113 through 117 are connected to shoe connecting terminals 205 through 209, respectively. Shoe terminals 113 through 117 of hot shoe 118 also serve as a mounting section on which audio input device 200 is mounted.

According to the embodiment, inserting fixed plate 202 into shoe rail 111 allows shoe terminals 113 through 117 to be connected to shoe connecting terminals 205 through 209, but the connecting way is not limited to it. Although shoe terminals 113 through 117 are needed as the mounting section of imaging device 100, shoe rail 111 is not necessarily disposed on imaging device 100. For example, suppose that imaging device 100 has a connector formed of shoe terminals 113 through 117 as the mounting section; similarly, audio input device 200 has a connector formed of shoe connecting terminals 205 through 209 as the attaching section. In that case, connecting the connectors mechanically and electrically allows the shoe terminals to be connected to the shoe connecting terminals.

Figure 3:
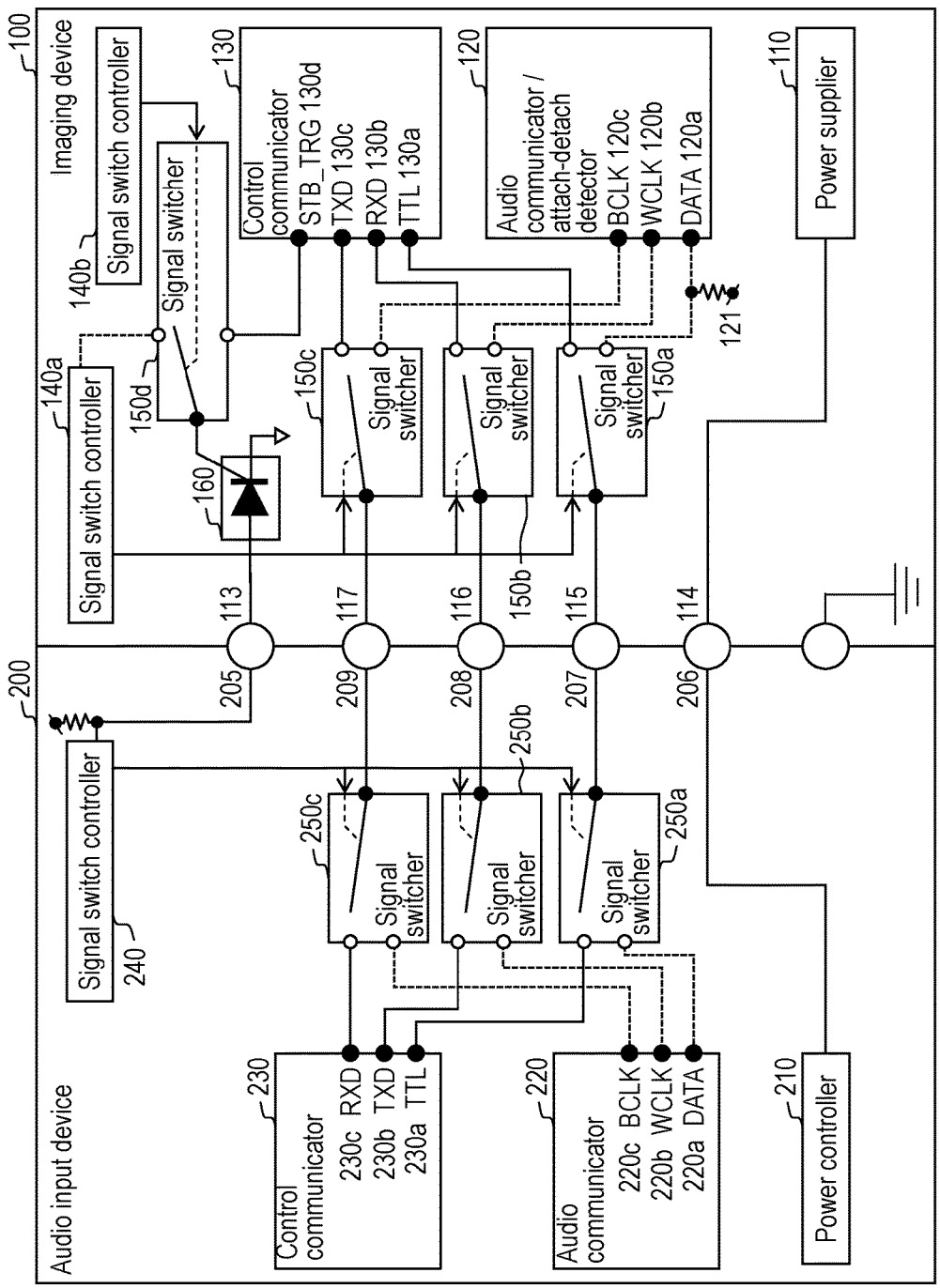
FIG. 3 is a block diagram showing a state where an audio input device is connected to the imaging device in accordance with the exemplary embodiment.

FIG. 3 is a block diagram showing the state where audio input device 200 is connected to imaging device 100 in accordance with the first exemplary embodiment. As shown in FIG. 3, imaging device 100 has shoe terminals 113 through 117, power supplier 110, audio communicator/attach-detach detector 120, control communicator 130, signal switch controllers 140a and 140b, signal switchers 150a through 150d, thyristor 160, and voltage determiner 121. Each of audio communicator/attach-detach detector 120, control communicator 130, and signal switch controllers 140a, 140b may be formed of a hard-wired electronic circuit, or may be a microcomputer controlled by programs. Further, they may be integrally formed into a single semiconductor chip as a controller. Although imaging device 100 further has a lens, an imaging element, memory, a monitor, and an operating section including a release button, they are omitted in FIG. 3. FIG. 3 shows imaging device 100 as the essential structure of the electronic device of the exemplary embodiment.

Voltage determiner 121 determines the electric potential of the data line connected to shoe terminal 115 to a first logical value (for example, H level). According to the embodiment, voltage determiner 121 is formed of a pull-up circuit disposed between signal switcher 150a and audio communicator/attach-detach detector 120. Besides, audio communicator/attach-detach detector 120 also functions as the attach-detach detector that detects whether audio input device 200 is attached to the mounting section or detached from there. To be specific, when detecting a logical value of H level that voltage determiner 121 has determined at shoe terminal 115, the attach-detach detector detects the absence of audio input device 200 on the mounting section of imaging device 100. The attach-detach detector may be formed as a structure separated from audio communicator/attach-detach detector 120.

Audio input 200 has, as shown in FIG. 3, shoe connecting terminals 205 through 209, power controller 210, audio communicator 220, control communicator 230, signal switch controller 240, and signal switchers 250a through 250c.

Imaging device 100 provides audio input device 200 with electric power. Specifically, power supplier 110 of imaging device 100 is connected to shoe terminal 114 as a power supply terminal, and shoe terminal 114 is connected to shoe connecting terminal 206 via hot shoe 118. Power supply controller 210 of audio input device 200 is connected to shoe connecting terminal 206. Electric power from power supplier 110 of imaging device 100 is thus fed into audio input device 200.

Signal switch controller 140a of imaging device 100 performs switching control of signal switchers 150a through 150c of imaging device 100. Signal switch controller 140b of imaging device 100 performs switching control of signal switcher 150d of imaging device 100.

Signal switcher 150a of imaging device 100 is connected to shoe terminal 115 as a signal terminal. Through the switching control of signal switch controller 140a, signal switcher 150a switches shoe terminal 115 so as to connect to either DATA terminal 120a of audio communicator/attach-detach detector 120 or TTL terminal 130a of control communicator 130. Similarly, signal switcher 150b of imaging device 100 is connected to shoe terminal 116 as a signal terminal. Through the switching control of signal switch controller 140a, signal switcher 150b switches shoe terminal 116 so as to connect to either WCLK terminal 120b of audio communicator/attach-detach detector 120 or RXD terminal 130b of control communicator 130. Similarly, signal switcher 150c of imaging device 100 is connected to shoe terminal 117 as a signal terminal. Through the switching control of signal switch controller 140a, signal switcher 150c switches shoe terminal 117 so as to connect to either BCLK terminal 120c of audio communicator/attach-detach detector 120 or TXD terminal 130c of control communicator 130.

Signal switcher 150d of imaging device 100 is connected via thyristor 160 to shoe terminal 113 as a signal terminal. Through the switching control of signal switch controller 140b, signal switcher 150d switches shoe terminal 113 so as to connect to either STB_TRG terminal 130d of control communicator 130 or signal switch controller 140a. Specific workings of signal switcher 150d will be described later.

Signal switch controller 240 of audio input device 200 is connected to shoe connecting terminal 205 and performs switching control of signal switchers 250a through 250c.

Signal switcher 250a of audio input device 200 is connected to shoe connecting terminal 207. Through the switching control of signal switch controller 240, signal switcher 250a switches shoe connecting terminal 207 so as to connect to either DATA terminal 220a of audio communicator 220 or TTL terminal 230a of control communicator 230. Similarly, signal switcher 250b of audio input device 200 is connected to shoe connecting terminal 208. Through the switching control of signal switch controller 240, signal switcher 250b switches shoe connecting terminal 208 so as to connect to either WCLK terminal 220b of audio communicator 220 or TXD terminal 230b of control communicator 230. Similarly, signal switcher 250c of audio input device 200 is connected to shoe connecting terminal 209. Through the switching control of signal switch controller 240, signal switcher 250c switches shoe connecting terminal 209 so as to connect to either BCLK terminal 220c of audio communicator 220 or RXD terminal 230c of control communicator 230.

Hereinafter, the initial state, the current limit state, the control communication mode, the negotiation, and the audio communication mode of imaging device 100 will be described.

[Initial State]

In the initial state where audio input device 200 is not attached to imaging device 100, each of signal switch controllers 140a and 140b of imaging device 100 outputs a signal of L level. At that time, in imaging device 100, the relation of connection between audio communicator/attach-detach detector 120, control communicator 130, signal switch controller 140a, and signal switchers 150a through 150d is shown by the solid lines of FIG. 3. That is, signal switchers 150a through 150c switch shoe terminals 115 through 117, respectively, to connect to control communicator 130. Similarly, signal switcher 150d switches thyristor 160 to connect to control communicator 130.

[Current Limit State and Control Communication Mode]

When audio input device 200 is attached to imaging device 100, imaging device 100 has been kept in the current limit state where power supply in imaging device 100 is limited at a minimum level enough for communication. In the state, shoe terminals 113 through 117 of imaging device 100 are electrically connected to shoe connecting terminals 205 through 209, respectively. Electric power fed from power supplier 110 of imaging device 100 is carried, via shoe terminal 114 and shoe connecting terminal 206, to power controller 210 of audio input device 200, by which control communicator 230 of audio input device 200 starts working.

Signal switch controller 240 of audio input device 200 is connected, via shoe connecting terminal 205, shoe terminal 113, and thyristor 160, to signal switcher 150d of imaging device 100. Signal switch controller 240 outputs a signal of a logical value the same as any one of signal switch controller 140a and STB_TRG terminal 130d of control communicator 130 of imaging device 100. Specifically, when audio input device 200 is attached to imaging device 100, signal switcher 150d switches to have connection to control communicator 130 according to the output of L level from signal switch controller 140b, so that signal switcher 150d is switched to connect to control communicator 130, outputting L level as the output of STB_TRG terminal 130d. At that time, thyristor 160 does not work, and therefore a signal of H level is fed, via shoe terminal 113 and shoe connecting terminal 205, to signal switch controller 240 of audio input device 200.

Receiving the signal of H level, signal switch controller 240 reverses the H level and outputs a signal of L level. In the state where signal switch controller 240 of audio input device 200 outputs a signal of L level, the relation of connection between audio communicator 220 of audio input device 200, control communicator 230, and signal switchers 250a through 250c is shown by the solid lines of FIG. 3. That is, signal switchers 250a through 250c switch shoe connecting terminals 207 through 209, respectively, to connect to control communicator 230.

As described above, employing signal switch controller 240 allows signal switchers 250a through 250c to switch to control communicator 230 in synchronization with signal switchers 150a through 150c switched to control communicator 130 controlled by signal switch controller 140a of imaging device 100. The switching above allows control communicator 130 of imaging device 100 to have communication with control communicator 230 of audio input device 200 via shoe terminals 115 through 117 of imaging device 100 and shoe connecting terminals 207 through 209 of audio input device 200. Imaging device 100 is thus put into the control communication mode.

[Negotiation]

Once the communication between imaging device 100 and audio input device 200 is established, TXD terminal 130c of imaging device 100 makes a request for sending the device ID to RXD terminal 230c of audio input device 200. Receiving the request, TXD terminal 230b of audio input device 200 performs negotiation for sending back the device ID to RXD terminal 130b of imaging device 100. Through the negotiation, imaging device 100 recognizes the device ID of audio input device 200 and determines that audio input device 200 is connected.

[Audio Communication Mode]

When recognizing the connection of audio input device 200, imaging device 100 releases power supplier 110 from the current limit state so as to provide audio input device 200 with electric power for working all the components of the device. Both of signal switch controllers 140a and 140b of imaging device 100 output a signal of H level. At that time, in imaging device 100, the relation of connection between audio communicator/attach-detach detector 120, control communicator 130, signal switch controller 140a, and signal switchers 150a through 150d is shown by the broken lines of FIG. 3. That is, signal switchers 150a through 150c switch shoe terminals 115 through 117, respectively, to connect to audio communicator/attach-detach detector 120; at the same time, signal switcher 150d switches thyristor 160 to connect to signal switch controller 140a.

Specifically, when imaging device 100 determines that audio input device3 200 is attached to it, signal switch controller 140b outputs a signal of H level. In response to the output, signal switcher 150d is switched to connect to signal switch controller 140a so as to output of the output (H level) from signal switch controller 140a. In the state above, thyristor 160 works, and therefore a signal of L level is fed, via shoe terminal 113 and shoe connecting terminal 205, to signal switch controller 240 of audio input device 200.

Receiving the signal of L level, signal switch controller 240 reverses the L level and outputs a signal of H level. In the state where signal switch controller 240 outputs a signal of H level, the relation of connection between audio communicator 220 of audio input device 200, control communicator 230, and signal switchers 250a through 250c is shown by the broken lines of FIG. 3. That is, signal switchers 250a through 250c switch shoe connecting terminals 207 through 209, respectively, to connect to audio communicator 220.

As described above, employing signal switch controller 240 allows signal switchers 250a through 250c to switch to audio communicator 220 in synchronization with signal switchers 150a through 150c switched to audio communicator/attach-detach detector 120 controlled by signal switch controller 140a of imaging device 100. The switching above allows audio communicator/attach-detach detector 120 of imaging device 100 to have communication with audio communicator 220 of audio input device 200 via shoe terminals 115 through 117 of imaging device 100 and shoe connecting terminals 207 through 209 of audio input device 200. Imaging device 100 is thus put into the audio communication mode.

As described above, to establish the control communication between imaging device 100 and audio input device 200, signal switch controller 140a of imaging device 100 outputs a signal of L level, by which control communicator 130 of imaging device 100 is connected to control communicator 230 of audio input device 200, allowing them to communicate with each other. To establish audio communication between imaging device 100 and audio input device 200, signal switch controller 140a of imaging device 100 outputs a signal of H level, by which audio communicator/attach-detach detector 120 of imaging device 100 is connected to audio communicator 220 of audio input device 200, allowing them to communicate with each other.

[1-2. Workings]

Figure 4:
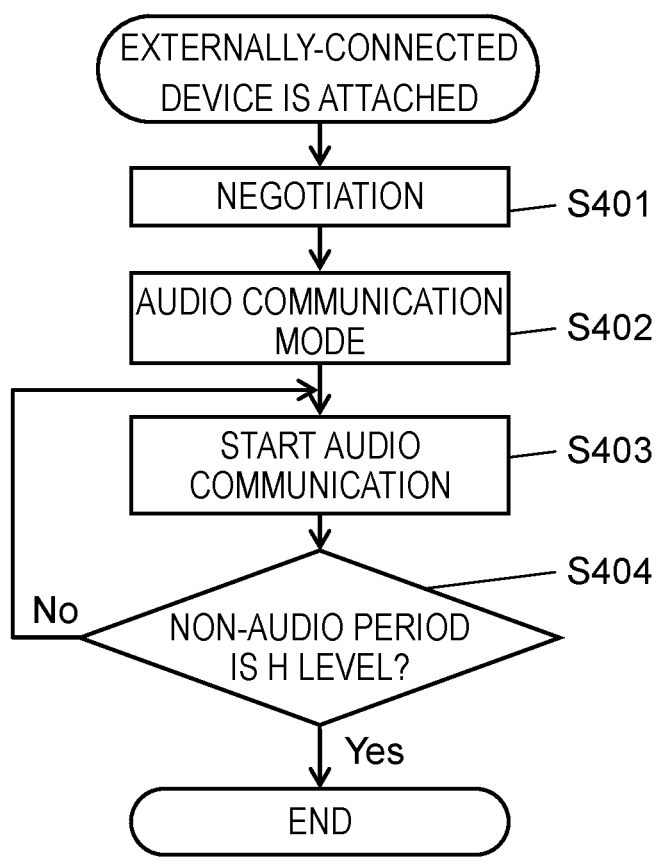
FIG. 4 is a flowchart showing the workings of the imaging device after an externally-connected device has been mounted on the imaging device in accordance with the exemplary embodiment.

The workings of imaging device 100 having the structure above will be described below. FIG. 4 is a flowchart showing the workings of imaging device 100 after an externally-connected device has been mounted on the imaging device in accordance with the exemplary embodiment. Once audio input device 200 as an externally-connected device is connected to imaging device 100, imaging device 100 begins procedures as shown in the flowchart of FIG. 4.

[Step S401]

Once audio input device 200 is attached to imaging device 100, the devices are put into the control communication mode described above. Control communicator 130 of imaging device 100 performs the aforementioned negotiation with control communicator 230 of audio input device 200. Negotiation allows imaging device 100 to recognize the device ID of audio input device 200, by which imaging device 100 determines that audio input device 200 is connected.

[Step S402]

When recognizing the connection with audio input device 200, imaging device 100 releases power supplier 110 from the current limit state so as to provide audio input device 200 with electric power for working all the components of the device. Besides, signal switch controller 140a of imaging device 100 outputs a signal of H level, by which audio communicator/attach-detach detector 120 of imaging device 100 is connected to audio communicator 220 of audio input device 200. The audio communication mode described above is thus established.

[Step S403]

Imaging device 100 starts audio communication on an audio data format of, for example, 12S (Inter-IC Sound).

Figure 5:
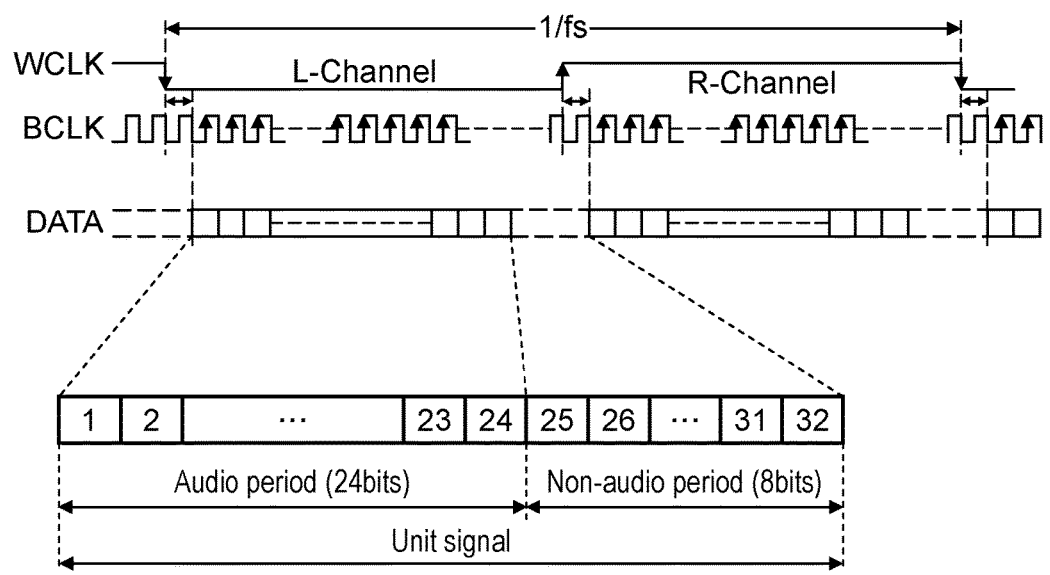
FIG. 5 illustrates audio data to be fed into the imaging device in accordance with the exemplary embodiment.

FIG. 5 illustrates audio data to be fed into audio communicator/attach-detach detector 120 of imaging device 100. The audio data of FIG. 5 is transmitted from audio input device 200 to imaging device 100 through the data line starting from DATA terminal 220a of audio communicator 220—via signal switcher 250a, shoe connecting terminal 207, shoe terminal 115, and signal switcher 150a—to DATA terminal 120a of audio communicator/attach-detach detector 120. The audio data, as shown in FIG. 5, is formed of a unit signal having an audio period (data period) in which an audio data signal is transmitted and a non-audio period (detection period) in which a detection signal is transmitted. To be specific, according to the embodiment, having a WCLK signal of 48 kHz and a BCLK signal of 3.072 MHz (64 fs), the audio data is formed of a 32-bit unit signal having 24-bit data period and 8-bit detection period. The detection period may be formed of at least 1 bit.

Figure 6:
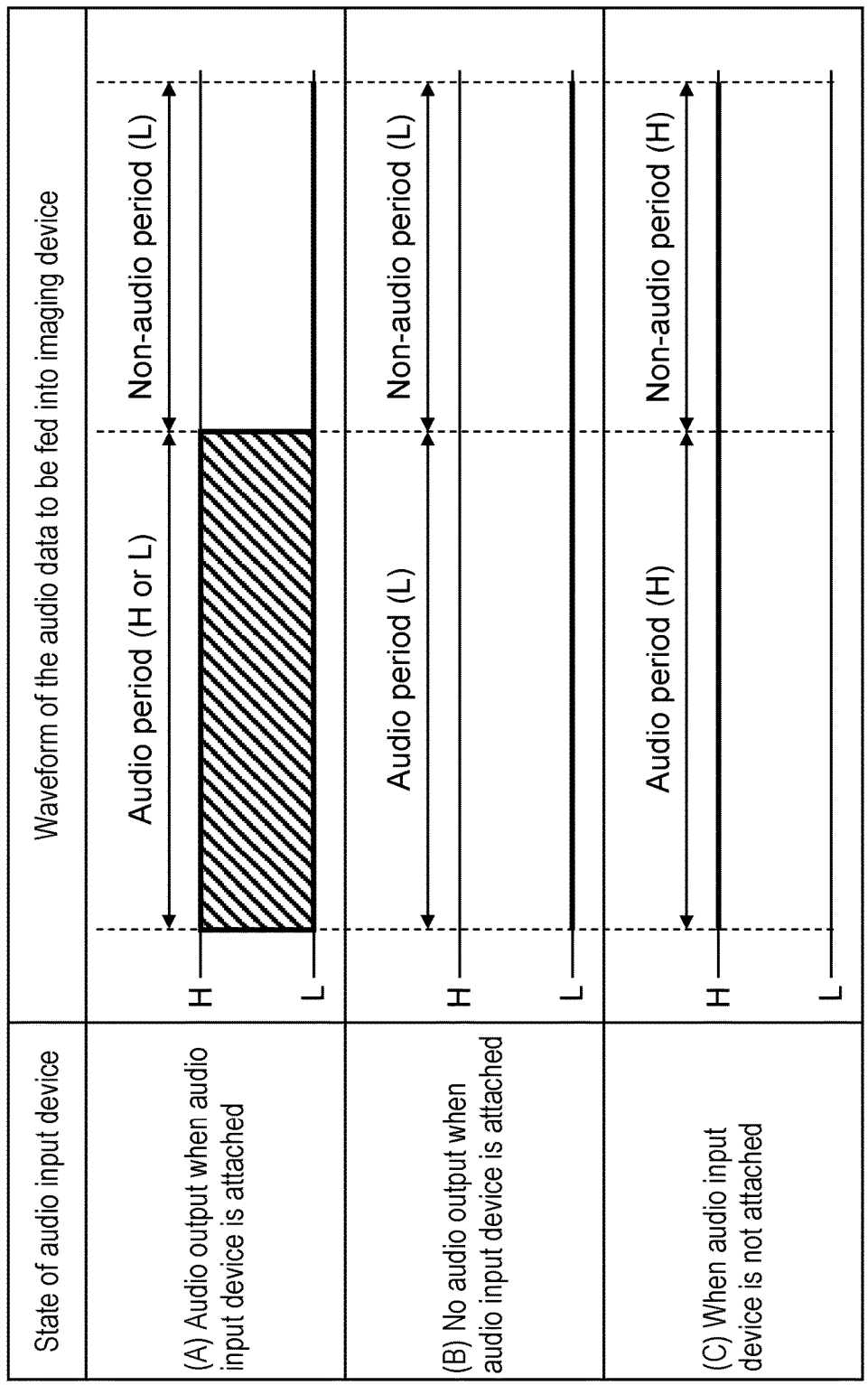
FIG. 6 shows a waveform of the audio data to be fed into the imaging device in accordance with the exemplary embodiment.

FIG. 6 shows a waveform of the audio data to be fed into audio communicator/attach-detach detector 120 of imaging device 100. When audio input device 200 is attached to imaging device 100 and audio communicator 220 has audio output, the audio data has a waveform shown in column A of FIG. 6. That is, in the audio period, audio communicator 220 outputs an audio data signal (of H level or L level for each bit) corresponding to audio output. In the non-audio period that follows the audio period, the audio communicator outputs a signal of L level (corresponding to the second logical value). When audio communicator 220 of audio input device 200 has no audio output, the waveform of audio data is shown in column B of FIG. 6. In the audio period, audio communicator 220 outputs a signal of L level because no audio output in the audio period, and in the non-audio period that follows the audio period, it outputs a signal of L level. That is, in the state where audio input device 200 is kept on imaging device 100, audio communicator 220 outputs a signal of L level consistently in the non-audio period, with no regard to presence or absence of audio output from audio communicator 220.

[Step S404]

In step S404 of the flowchart of FIG. 4, audio communicator/attach-detach detector 120 of imaging device 100 checks whether the signal fed in the non-audio period is H level or L level. If audio communicator/attach-detach detector 120 detects that the signal is L level (corresponding to 'No' in step S404), it determines that audio input device 200 is kept on imaging device 100, the system goes back to step S403 to continue audio communication.

If audio communicator/attach-detach detector 120 of imaging device 100 detects that the signal fed in the non-audio period is H level (corresponding to 'Yes' in step S404), it determines that audio input device 200 is kept off imaging device 100. Specifically, when audio input device 200 has been kept off (or has just detached from) imaging device 100, audio communicator/attach-detach detector 120 detects a signal of H level (corresponding to the first logical value) that is determined by voltage determiner 121 employing a pull-up structure on DATA terminal 120a of audio communicator/attach-detach detector 120 of imaging device 100. Detecting the signal of H level, audio communicator/attach-detach detector 120 detects that imaging device 100 has no audio input device 200 on the mounting section. In the state above, shoe terminal 115 is kept open, so that voltage determiner 121 determines the electric potential of DATA terminal 120a to have H level consistently during the audio period and the non-audio period.

In the negotiation mode (i.e., in step S401 of FIG. 4), if imaging device 100 does not recognize the device ID of audio input device 200, signal switcher 150a does not switch to DATA terminal 120a. Therefore, even if audio input device 200 is fixed to hot shoe 118, voltage determiner 121 determines the electric potential of DATA terminal 120a to H level. In this case, the data fed into audio communicator/attach-detach detector 120 of imaging device 100 has a waveform the same as that shown in column C of FIG. 6.

According to the embodiment, as described above, if connection trouble occurs (for example, audio input device 200 is forcibly removed from imaging device 100) while audio communicator/attach-detach detector 120 of imaging device 100 is being connected to audio communicator 220 of audio input device 200, imaging device 100 detects the connection trouble from a detection signal fed into DATA terminal 120a.

If connection trouble on audio input device 200 is detected while audio input device 200 is being connected to imaging device 100, signal switch controller 140a of imaging device 100 outputs a signal of L level, by which control communicator 130 of imaging device 100 is connected to control communicator 230 of audio input device 200 for performing negotiation again.

As described above, imaging device 100 of the present disclosure has shoe terminal 115, voltage determiner 121, and audio communicator/attach-detach detector 120. Shoe terminal 115 accepts removably connected audio input device 200 and connects to a data line. Voltage determiner 121 determines the electric potential of the data line to H level when audio input device 200 is detached from shoe terminals 113 through 117. Audio communicator/attach-detach detector 120 detects the absence or presence of audio input device 200 on shoe terminals 113 through 117. Audio input device 200 outputs a unit signal to audio communicator/attach-detach detector 120 through the data line. The unit signal has a data period for transmitting an audio data signal and a detection period for transmitting a detection signal, and the detection signal has either of two logical values—L level or H level—according to the absence or presence of audio input device 200. Receiving a logical value of L level or H level, audio communicator/attach-detach detector 120 detects the absence or presence of audio input device 200 on shoe terminals 113 through 117. With the structure above, imaging device 100 detects the absence or presence of an externally-connected device by using an existing data line, with no need for a dedicated detection line.

Other than an audio input device and a flashing device, the externally-connected devices may be next-generation high-speed communication devices, such as Bluetooth (registered trademark) adaptive to high-resolution transmission, a multichannel-adaptive network audio system, and high-speed packet communication. When an externally-connected device other than an audio input device is connected to the electronic device, communication data corresponding to each externally-connected device is transmitted to the data line.

According to the embodiment described above, audio input device 200 as an externally-connected device is attached to hot shoe 118 of imaging device 100, but it is not limited to; an externally-connected device may be attached to an accessory shoe having a shoe terminal as the mounting section of the electronic device.

It will be understood that the aforementioned embodiment is merely an example of the technique of the present disclosure. That is, the technique of the present disclosure is not limited to the structure described above, allowing modification, replacement, addition, and omission without departing from the spirit and scope of the claimed disclosure.

INDUSTRIAL APPLICABILITY

The present disclosure is applicable to an electronic device having a hot shoe. Specifically, it is applicable to cameras, video-shooting devices, mobile phones with a photo-shooting function, and smartphones.

What is claimed is:

1. An electronic device comprising:
   a mounting section that accepts a removable, externally-connected device and connects to a data line into which a unit signal having a data period for transmitting a data signal and a detection period for transmitting a detection signal is fed from the externally-connected device;
   a voltage determiner that causes an electric potential of the data line to have a first logical value while the externally-connected device is detached from the mounting section; and
   an attach-detach detector that detects whether the externally-connected device is mounted on, or detached from the mounting section,
   wherein, the attach-detach detector detects whether the externally-connected device is mounted on, or detached from the mounting section by detecting the detection signal of the unit signal having either the first logical value caused by the voltage determiner or a second logical value, and
   the data line serves as a detection line transmitting the detection signal to the attach-detach detector, and as a communication line for carrying out data communications between the externally-connected device and the electronic device.

2. The electronic device of claim 1, wherein once the externally-connected device is mounted on the electronic device, the second logical value is set to the detection signal regardless whether the externally-connected device outputs the data signal or not.

3. The electronic device of claim 1 further comprising:
   a signal switcher that switches the mounting section to connect to the data line or not,
   wherein, the voltage determiner is connected to the data line between the attach-detach detector and the mounting section.

4. The electronic device of claim 1, wherein the mounting section forms a hot shoe or an accessory shoe.

5. The electronic device of claim 1, wherein the attach-detach detector analyzes the unit signal only during the detection period to detect whether the externally-connected device is mounted on, or detached from the mounting section.

* * * * *